(No Model.) 2 Sheets—Sheet 2.

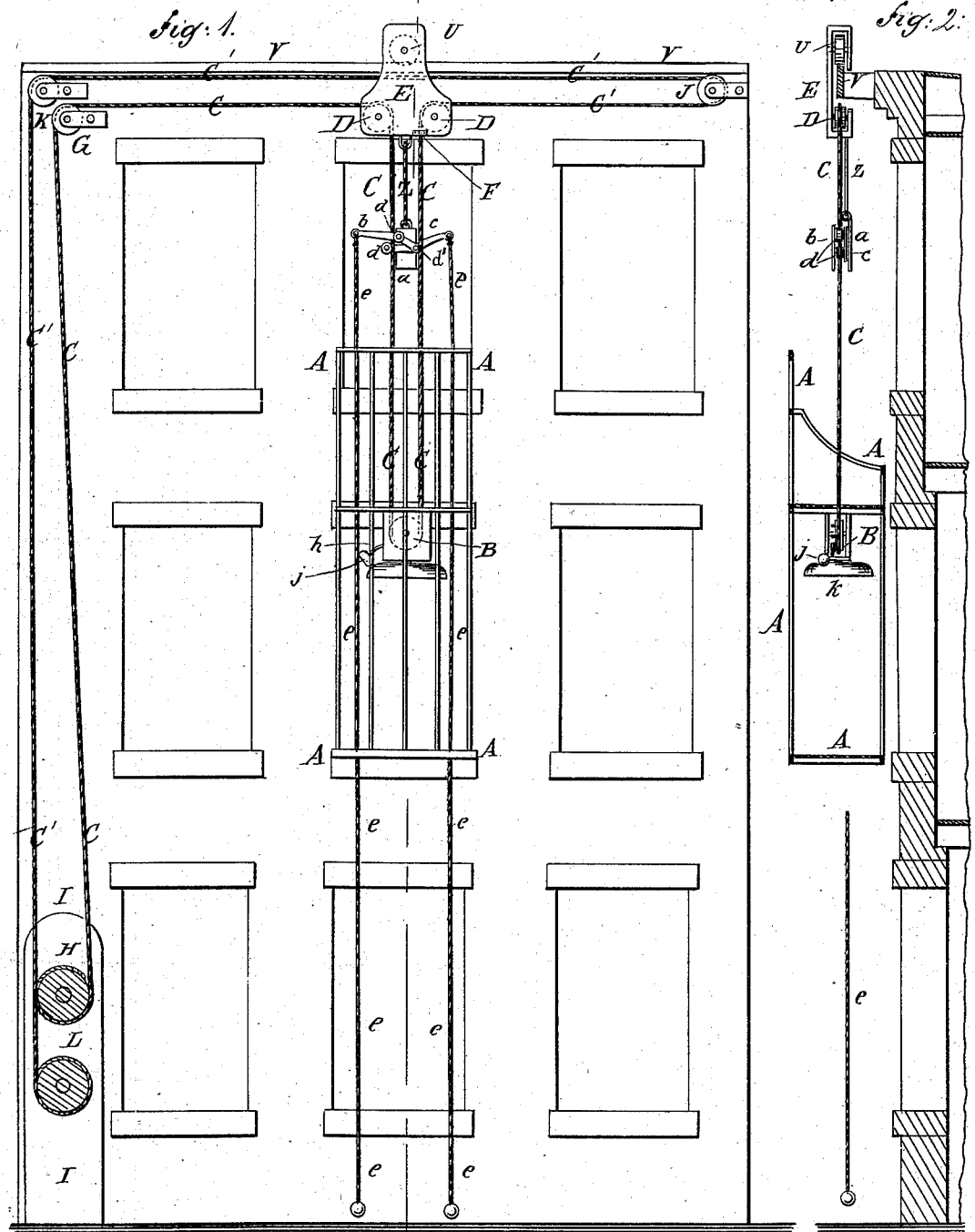

R. P. CLARK.
FIRE ESCAPE.

No. 292,989. Patented Feb. 5, 1884.

WITNESSES:
Chas. Nide
C. Sedgwick

INVENTOR:
R. P. Clark
BY Munn & Co.
ATTORNEYS.

UNITED STATES PATENT OFFICE.

ROBERT P. CLARK, OF PHILADELPHIA, PENNSYLVANIA.

FIRE-ESCAPE.

SPECIFICATION forming part of Letters Patent No. 282,889, dated February 5, 1884.

Application filed April 16, 1883. (No model.)

*To all whom it may concern:*

Be it known that I, ROBERT PAUL CLARK, of Philadelphia, in the county of Philadelphia and State of Pennsylvania, have invented a new and useful Improvement in Fire-Escapes, of which the following is a full, clear, and exact description.

Reference is to be had to the accompanying drawings, forming a part of this specification, in which similar letters of reference indicate corresponding parts in all the figures.

Figure 3:
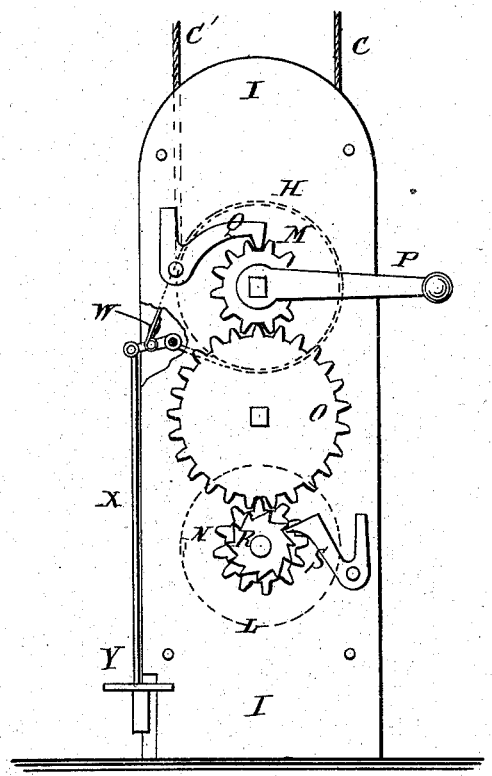
Figure 4:
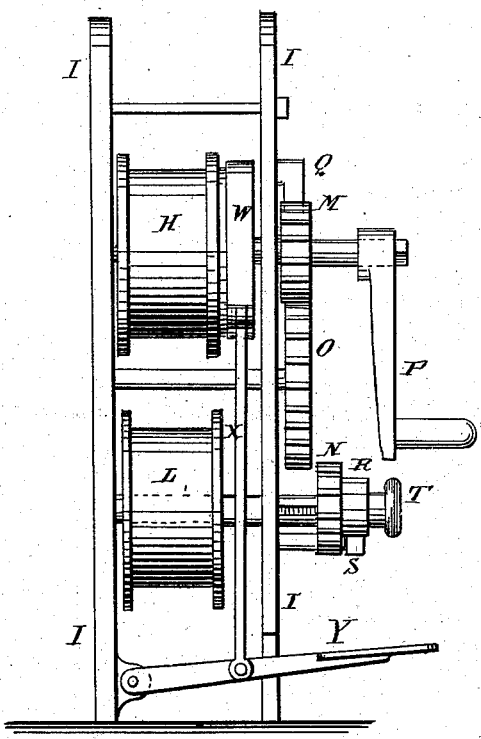
Figure 5:
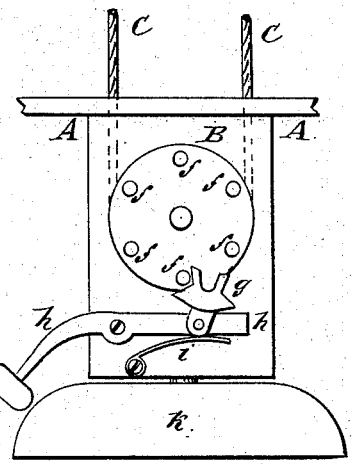

Figure 1, Sheet 1, is a front elevation of my improvement, partly in section, and shown as applied to a house. Fig. 2, Sheet 1, is a sectional side elevation of the same, taken through the line $x\ x$, Fig. 1. Fig. 3, Sheet 2, is a front elevation of the driving mechanism. Fig. 4, Sheet 2, is a side elevation of the same. Fig. 5, Sheet 2, is a front elevation of the alarm mechanism.

The object of this invention is to facilitate the removal of people from burning buildings.

The invention consists in a fire-escape constructed with a cage suspended from a horizontally-traveling car by operating-ropes, which pass over guide-pulleys, and are attached to drums made to revolve in opposite directions by connecting gear-wheels, and operated by a crank attached to the journal of one of the drums, one of the gear-wheels being connected with the journal of its drum by a tongue and groove, and provided with a ratchet-wheel and pawl to hold it and its drum from revolving when disconnected from the other gear-wheels, so that the drums can be connected to move the cage vertically and disconnected to move the cage horizontally. From the horizontally-traveling car is suspended a support, to which are pivoted levers provided with cords, for clamping the operating-rope to stop the descent of the cage. The operating-rope pulley pivoted to the cage carries pins to engage with a forked trip-lock hinged to a spring-held bell-hammer lever, so that the bell-hammer lever will be operated to sound an alarm by the movement of the cage, as will be hereinafter fully described.

A represents the cage, which may be made with one or two floors and of any desired size.

To the cage A is pivoted a pulley, B, around which passes a part, C, of the operating-rope. The operating-rope C C' passes over two pulleys, D, pivoted to the lower corners of the carriage E, and is secured to one corner of the said carriage by a staple, F, or other fastening. The part C of the rope passes to and over a pulley, G, pivoted to a support attached to the building at or near an upper corner, and then passes down and is attached to and wound upon a drum, H, the journals of which revolve in bearings in a box or frame, I, secured to the building or other suitable support in such a position as to be conveniently accessible from the ground. The part C' of the operating-rope passes around a pulley, J, pivoted to a support attached to the building at or near its other upper corner, passes back along the building to and over a pulley, K, pivoted to a support attached to the first-mentioned upper corner of the building, a little above and beyond the pulley G, and passes down and is attached to a drum, L, and is wound around the said drum in the opposite direction from that in which the rope C is wound around the drum H. The journals of the drum L revolve in bearings in the box or frame I, below the drum H.

To the outer journals of the drums H L are attached gear-wheels M N, of the same size, and the teeth of which mesh into the teeth of an intermediate gear-wheel, O, pivoted to the frame or box I midway between the said gear-wheels M N, so that the two drums will be turned in opposite directions and at the same speed by turning either of the said drums. Motion is given to the drums H L by a crank, P, attached to the end of the outer journal of the drum H, and the said drums H L are held in any position into which they may be turned by a pawl, Q, pivoted to the frame or box I, and which engages with the teeth of the gear-wheel M. The gear-wheel N slides upon the journal of the drum L, and is connected with the said journal by a tongue and groove, so that the said gear-wheel and drum will always revolve together.

Upon the outer side of the gear-wheel N is formed, or to it is attached, a ratchet-wheel, R, with the teeth of which engages the pawl S, pivoted to the frame or box I. The pawl S is so arranged that it will engage with the teeth of the ratchet-wheel R before the teeth of the gear-wheel N leave the teeth of the gear-wheel O, and will be out of gear with the teeth of the said ratchet-wheel R when the teeth of the gear-wheel N are fully in gear with the teeth of the gear-wheel O, so that the drum L will always be securely held. The gear-wheel N is moved out and in to throw it out of and into gear with the wheel O by means of a knob, T, attached to the hub of the ratchet-wheel R.

To the upper part of the carriage E is pivoted a pulley, U, which rests and rolls upon a track, V, secured to supports attached to the upper part of the building. With this construction, by operating the crank P when the gear-wheel N is in gear with the gear-wheel O, one of the ropes C C' will be wound upon and the other will be unwound from the drums H L, and the cage A will be moved horizontally along the building without being raised or lowered, so that people can be taken out of any window across which the said cage is carried. When the gear-wheel N is thrown out of gear with the gear-wheel O, the rope C' and drum L will be held stationary by the pawl S, and the cage will be raised or lowered by turning the crank P in one or the other direction.

Over one end of the drum H, or over a friction-wheel attached to the said end, passes a brake-strap, W, one end of which is secured to the frame or box I. The other end of the brake-strap W is connected with the upper end of the rod X, the lower end of which is attached to the treadle Y. The rear end of the treadle Y is hinged to a support attached to the lower part of the frame or box I, and its forward end projects into such a position that it can be readily reached and operated with his foot by the man that operates the crank P. The brake W X Y enables the operator, when lowering the cage A, to readily control the rapidity of descent.

To the middle part of the lower end of the carriage E is attached a short rope or chain, Z, to the lower end of which is attached a block, $a$. To the block $a$ are pivoted two levers, $b\ c$, by the same bolt at $d'$, the lever $b$ being pivoted at its end and the lever $c$ at a little distance from its end.

To the lever $b$, at a little distance from its inner end, and to the inner end of the lever $c$, are pivoted two rollers, $d$, which rest against the opposite sides of the rope C.

To the outer ends of the levers $b\ c$ are attached the upper ends of two cords, $e$, which pass down through the bottom of the cage A and extend to or nearly to the ground. With this construction, by operating either or both of the levers $b\ c$ by the cord or cords $e$, the rope C will be clamped and the descent of the cage will be stopped. The cords $e$ can also be used by persons upon the ground to guide the cage in its descent.

To the pulley B, or to a wheel attached to the said pulley or its journal, are attached a number of projecting pins, $f$, which, as the said pulley B revolves, strike successively one or the other of the arms of the fork $g$, hinged to the lever $h$, and operate the said lever. The lever $h$ is fulcrumed at its middle part to the support for the pulley B, is held up by a spring, $i$, attached to the said support, and to its other end is attached a hammer, $j$, which, at each movement of the said lever, strikes a gong, $k$, secured to the support for the pulley B or to the car-frame, and sounds an alarm to give notice to the people in the building and upon the ground that the car A is moving.

Having thus fully described my invention, I claim as new and desire to secure by Letters Patent—

1. In a fire-escape, the combination, with the cage A, of the ropes C C', the carriage E, the drums H L, the gear-wheels M N O, the ratchet-wheel and pawl R S, and the crank P, substantially as herein shown and described, whereby the said cage can be moved laterally and vertically, as set forth.

2. In a fire-escape, the combination, with the carriage E and the cage-operating rope C, of the suspended support $a$, the levers $b\ c$, and the cords $e$, said levers having rollers $d$ arranged on opposite sides of one of the cords $e$, substantially as herein shown and described, whereby the descent of the cage can be stopped, as set forth.

3. In a fire-escape, the combination, with the cage A and the operating-rope pulley B, of the pins $f$, the spring-held hammer-lever $h$, the two-armed trip-block $g$, pivoted to the latter and adapted to engage the aforesaid pins, and the gong $k$, substantially as herein shown and described, whereby the movement of the cage will sound an alarm, as set forth.

ROBERT P. CLARK.

Witnesses:
CHARLES RITTER,
WM. K. HOCKMAN.